United States Patent
Lewis et al.

(10) Patent No.: US 12,218,895 B2
(45) Date of Patent: *Feb. 4, 2025

(54) MESSAGING FOR EVENT LIVE-STREAM

(71) Applicant: Google LLC, Mountain View, CA (US)

(72) Inventors: Justin Lewis, Marina del Rey, CA (US); Kevin Greene, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,549

(22) Filed: Aug. 8, 2022

(65) Prior Publication Data

US 2022/0385604 A1 Dec. 1, 2022

Related U.S. Application Data

(63) Continuation of application No. 17/027,694, filed on Sep. 21, 2020, now Pat. No. 11,411,901, which is a
(Continued)

(51) Int. Cl.
*H04L 51/046* (2022.01)
*A63F 13/87* (2014.01)
(Continued)

(52) U.S. Cl.
CPC ............ *H04L 51/046* (2013.01); *A63F 13/87* (2014.09); *G06F 3/04842* (2013.01);
(Continued)

(58) Field of Classification Search
CPC ............... A63F 13/87; A63F 2300/577; G06F 3/04842; H04L 41/5041; H04L 41/5093;
(Continued)

(56) References Cited

U.S. PATENT DOCUMENTS 6,760,749 B1   7/2004 Dunlap et al.
7,386,799 B1 * 6/2008 Clanton ................. A63F 13/12
                                                715/861
(Continued)

FOREIGN PATENT DOCUMENTS

CN      102150175 A     8/2011
WO      2013151759 A1   10/2013

OTHER PUBLICATIONS

International Search Report and Written Opinion for International Application No. PCT/US2014/65767 mailed Feb. 26, 2015, 2015, 9 pages.
(Continued)

*Primary Examiner* — Justin R. Blaufeld
(74) *Attorney, Agent, or Firm* — Lowenstein Sandler LLP

(57) ABSTRACT

A messaging system for a live event is described. A processing device presents a live event having at least one participant. The processing device presents one or more participant messages within a messaging user interface associated with the event. The processing device also presents one or more viewer messages within the messaging user interface. The viewer messages are integrated with the participant messages.

18 Claims, 8 Drawing Sheets

Related U.S. Application Data continuation of application No. 14/541,030, filed on Nov. 13, 2014, now Pat. No. 10,785,174.

(60) Provisional application No. 61/905,137, filed on Nov. 15, 2013.

(51) Int. Cl.
| | |
|---|---|
| G06F 3/04842 | (2022.01) |
| H04L 41/50 | (2022.01) |
| H04L 41/5041 | (2022.01) |
| H04L 51/04 | (2022.01) |
| H04L 51/212 | (2022.01) |
| H04L 51/214 | (2022.01) |
| H04L 51/52 | (2022.01) |
| H04L 51/56 | (2022.01) |
| H04L 65/401 | (2022.01) |
| H04L 65/403 | (2022.01) |
| H04L 65/612 | (2022.01) |
| H04N 21/4788 | (2011.01) |

(52) U.S. Cl.
CPC ...... *H04L 41/5041* (2013.01); *H04L 41/5093* (2013.01); *H04L 51/04* (2013.01); *H04L 51/212* (2022.05); *H04L 51/214* (2022.05); *H04L 51/52* (2022.05); *H04L 51/56* (2022.05); *H04L 65/4015* (2013.01); *H04L 65/403* (2013.01); *H04L 65/612* (2022.05); *H04N 21/4788* (2013.01); *A63F 2300/51* (2013.01); *A63F 2300/572* (2013.01); *A63F 2300/577* (2013.01)

(58) Field of Classification Search
CPC ....... H04L 51/04; H04L 51/046; H04L 51/12; H04L 51/14; H04L 51/32; H04L 51/36; H04L 65/4015; H04L 65/403; H04L 65/4084; H04N 21/4788
See application file for complete search history.

(56) References Cited

U.S. PATENT DOCUMENTS

| | | | |
|---|---|---|---|
| 7,603,379 B2 | 10/2009 | Kang et al. | |
| 8,019,815 B2 | 9/2011 | Keener, Jr. et al. | |
| 8,821,297 B1* | 9/2014 | Nagata | H04L 51/046 463/29 |
| 9,266,017 B1* | 2/2016 | Parker | A63F 13/77 |
| 9,445,392 B1 | 9/2016 | Sharma et al. | |
| 10,630,746 B1* | 4/2020 | Shen | H04L 65/70 |
| 10,785,174 B2* | 9/2020 | Lewis | H04L 41/5093 |
| 2002/0119823 A1 | 8/2002 | Beuscher | |
| 2003/0220143 A1 | 11/2003 | Shteyn et al. | |
| 2004/0179039 A1* | 9/2004 | Blattner | H04L 51/00 715/758 |
| 2005/0038892 A1 | 2/2005 | Huang et al. | |
| 2006/0058103 A1* | 3/2006 | Danieli | A63F 13/87 463/42 |
| 2006/0098013 A1* | 5/2006 | Wong | A63F 13/5252 345/473 |
| 2006/0236344 A1 | 10/2006 | Brain et al. | |
| 2008/0043089 A1 | 2/2008 | Auerbach et al. | |
| 2008/0209075 A1 | 8/2008 | Shamma | |
| 2009/0006410 A1 | 1/2009 | Choi | |
| 2009/0013263 A1 | 1/2009 | Fortnow et al. | |
| 2009/0253513 A1* | 10/2009 | Ducheneaut | A63F 13/87 463/42 |
| 2009/0254931 A1 | 10/2009 | Pizzurro et al. | |
| 2009/0293079 A1 | 11/2009 | McKee et al. | |
| 2010/0304806 A1* | 12/2010 | Coleman | A63F 13/69 463/2 |
| 2011/0022471 A1 | 1/2011 | Brueck et al. | |
| 2011/0153743 A1 | 6/2011 | Lindner et al. | |
| 2011/0197237 A1 | 8/2011 | Turner | |
| 2011/0288912 A1 | 11/2011 | McCrea et al. | |
| 2012/0122577 A1* | 5/2012 | Aronzon | A63F 13/25 463/36 |
| 2012/0144318 A1* | 6/2012 | Khadilkar | H04L 51/222 715/753 |
| 2013/0055112 A1 | 2/2013 | Joseph et al. | |
| 2013/0079144 A1 | 3/2013 | Ahmed et al. | |
| 2013/0097635 A1 | 4/2013 | Yerli | |
| 2013/0123019 A1* | 5/2013 | Sullivan | A63F 13/35 463/42 |
| 2013/0198656 A1 | 8/2013 | Jones et al. | |
| 2013/0227030 A1 | 8/2013 | Eidelson et al. | |
| 2013/0227434 A1 | 8/2013 | Jones et al. | |
| 2013/0263021 A1 | 10/2013 | Dunn et al. | |
| 2013/0288799 A1* | 10/2013 | Harris | A63F 13/86 463/42 |
| 2013/0290516 A1 | 10/2013 | Eaton et al. | |
| 2014/0040404 A1 | 2/2014 | Pujare et al. | |
| 2014/0365921 A1 | 12/2014 | Gupta et al. | |
| 2015/0019964 A1 | 1/2015 | Campbell | |
| 2017/0006322 A1* | 1/2017 | Dury | H04N 21/254 |

OTHER PUBLICATIONS

Extended European Search Report dated Mar. 24, 2017 issued by the European Patent Office in counterpart European Application No. 14 86 2985.0.

Notice of Preliminary Rejection dated May 16, 2017 issued by the Korean Patent Office in counterpart Korean Application No. 10-2016-7015803, 8 pages.

Stark Insider "Demo of HayWire messaging app for iPhone, iPad" You Tube video publsihed Dec. 22, 2010.

Benziga Staff AEG Digital Media to Offer Powerful Social Media Tools for Enhanced Online Viewing and Live Event Interaction May 11, 2010, 5 pages.

Venables, Michael, "Review: OnLive—The what, why and who of gaming in the cloud," Jun. 2, 2011, 11 pages.

European Application No. 19164762.7, Extendend European Search Report dated Apr. 15, 2019, 10 pgs.

Smith et al., "Live-Streaming Changes the (Video) Game" EuroITV'13, Jun. 24-26, 2013, Como, Italy.

"AdventureQuest Worlds: How to use chat," Jan. 17, 2012, accessed Sep. 23, 2019 https://web.archive.org/web/20120117213311/https://www.aq.com/info/handbook/chat.asp.

India Application No. 201647019489, Examination Report dated Jul. 8, 2020, 7 pgs.

Brazil Application No. BR112016010707-1, Office Action dated Jun. 14, 2022, 4 pgs.

Kaytoue M., et al., Watch Me Playing: I am a Professional: A First Study on Video Game Live Streaming, Proceeding of the 21st International Conference on World Wide Web, Apr. 2012, 9 Pages.

Liang X., "Design and Application of the Internet Game Software on a TV Show," Popular Science Technology, Apr. 2012, 8 pages.

Office Action for Chinese Patent Application No. CN202110556909, mailed Dec. 13, 2023, 20 Pages.

Smith T., et al., "Live-streaming Changes the (video) Game," Proceedings of the 11th European Conference on Interactive TV and Video, Jun. 2013, 8 pages.

Zhang Y., "Large-Scale Game Observing System Based on Peer-to-Peer Networks," Chinese Master's Theses Full-Text Database, Dec. 2011, 65 Pages.

* cited by examiner

MESSAGING FOR EVENT LIVE-STREAM

RELATED APPLICATION

This application is a continuation application of U.S. patent application Ser. No. 17/027,694, filed Sep. 21, 2020, which is a continuation application of U.S. patent application Ser. No. 14/541,030, filed Nov. 13, 2014, now U.S. Pat. No. 10,785,174, which claims the benefit of priority U.S. Patent Application No. 61/905,137, filed Nov. 15, 2013, each of which is incorporated herein by reference.

TECHNICAL FIELD

Implementations of the present disclosure relate to a live-streaming system, and more specifically, to messaging for an event live-stream.

BACKGROUND

An online activity platform enables a participant to host a live event. A live event can include a live-stream video game, an online lecture, or a digital concert. The online activity platform can send a digital representation of the event (e.g., a live stream) to a content platform. Viewers can watch the live event via the content platform.

SUMMARY

The below summary is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a method for providing a messaging system for a live event is described. The method includes presenting a live event having at least one participant. The method also includes presenting one or more participant messages within a native messaging interface associated with the event. The method further includes presenting one or more viewer messages within the native messaging interface. The viewer messages are integrated with the participant messages and the viewer messages are entered via a non-native messaging interface.

In implementations, the event is one of a video game, an educational lecture, a digital concert, or a webcast. In implementations, the one or more participant messages includes participant messages from multiple participants.

In implementations, method further includes providing a set of configuration options to permit the participant to customize message presentation of the native messaging interface. The set of configuration options can include an option to permit the participant to segregate the one or more participant messages from the viewer messages. The set of configuration options can include an option to permit the participant to configure an appearance of one or more participant messages. The appearance can be related to at least one of a font, color, typeset, style, size, or text effect.

In implementations, when presenting the one or more viewer messages within the native messaging interface, the method includes receiving a viewer message entered via the non-native interface. The method also includes identifying an event identifier of the event. The method further includes selecting one or more viewer messages corresponding to the event identifier.

In implementations, when presenting the one or more participant messages within the native messaging interface, the method includes receiving a participant message, identifying an event identifier of the event, and selecting one or more participant messages corresponding to the event identifier.

In additional implementations, computing devices for performing the operations described herein are also implemented. Additionally, in embodiments of the disclosure, a computer readable storage media stores instructions for performing the operations of the above described embodiments. In other implementations, an apparatus that includes means for performing the operations described herein are also implemented.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Figure 1:
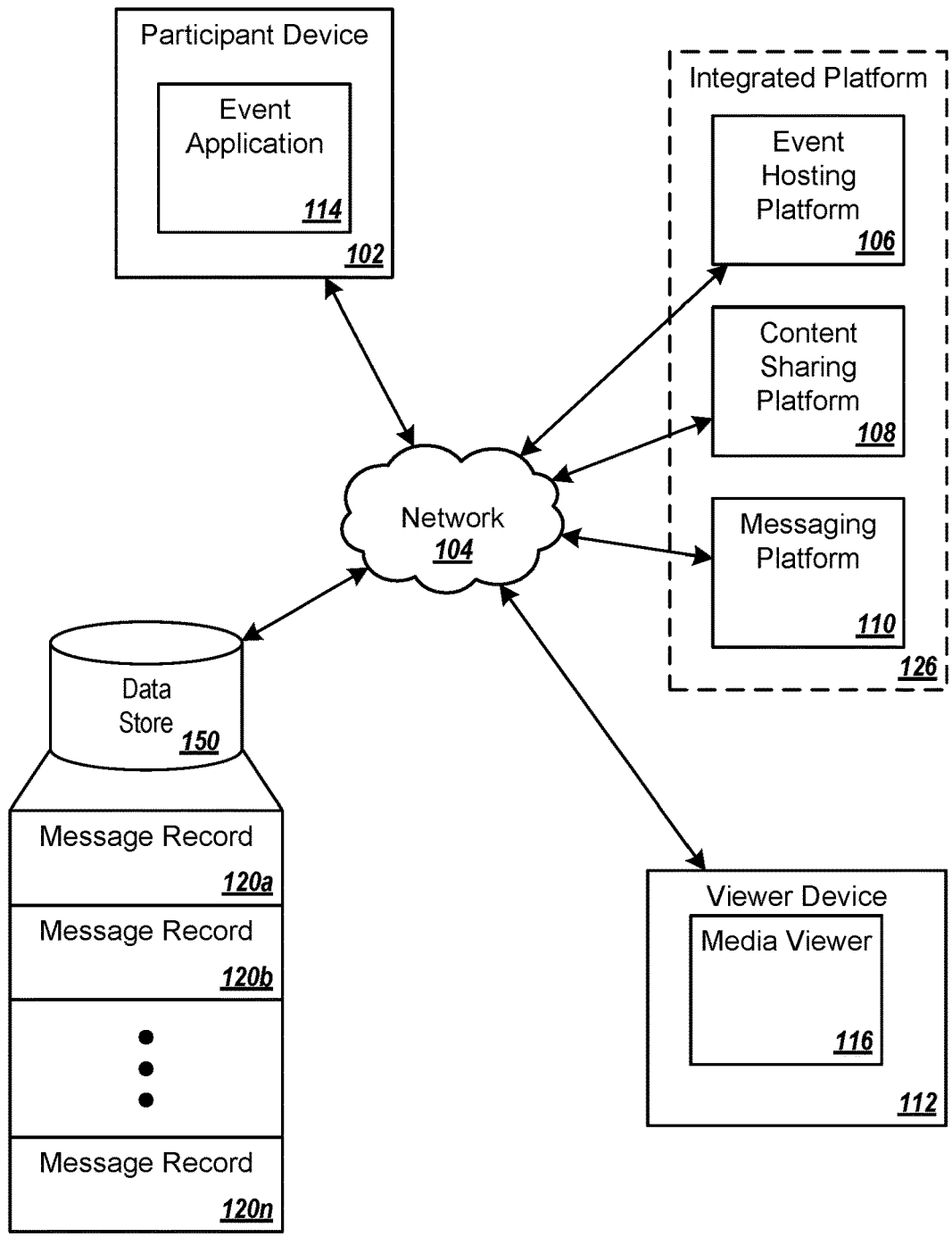
FIG. 1 illustrates an example network architecture in which embodiments of the present disclosure can be implemented.

The following disclosure sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely examples. Particular implementations may vary from these example details and still be contemplated to be within the scope of the present disclosure.

Implementations of the disclosure pertain to messaging for a live event. Conventional online activity platforms enable a participant to host a live event. A live event can include, for example, a live-stream video game, an online lecture, a webcast or a digital concert. The online activity platform can send a digital representation of the event (e.g., a live stream) to a content platform. Viewers can watch the live event via the content platform. Viewers can also exchange messages amongst each other through the content platform. Conventional online activity platforms do not permit the participant to communicate with the viewers via the content platform. To communicate with viewers, participants conventionally use messaging services outside of the online activity platform. The participants often use a separate monitor or screen or even a separate computer device solely for messaging the viewers. Conventional video games or video game platforms also do not provide the player with an in-game messaging component for communicating with viewers of the live-stream. Instead, the player may need to use third-party (i.e., outside of the game) messaging services to communicate with the viewers.

Implementations of the present disclosure address the above deficiencies of conventional systems by providing a mechanism for a participant of a live event hosted by an online activity platform to communicate with viewers that are watching the event via a content platform. For example, a messaging component can be provided that can include a graphical user interface that presents, to the participant, messages of the participant and messages of the viewers of the event. As a result, the participant of a live event can effectively engage with the viewers of the live event without facing distractions associated with using separate monitors or computer device for messaging viewers.

As used herein, a media item can include "stream," "live-stream," "game stream," "video game," "media," "online media item," "digital media," and a "digital media item" can include one or more electronic files that can be executed or loaded using software, firmware or hardware configured to present the media item to an entity. Content can also include live-streamed content and media items available on-demand.

FIG. 1 illustrates an example network architecture 100 in which embodiments of the present disclosure can be implemented. The network architecture 100 includes participant device 102, a network 104, an event hosting platform 106, a content platform 108, a messaging platform 110, a viewer device 112 and a data store 150.

The participant device (a device of a user who is part of a live event) 102 and viewer device (a device of a user who is watching a live event) 112 may each include a computing device such as a personal computer (PC), game console, set top box, laptop, mobile phone, smart phone, tablet computer, netbook computer, e-reader, personal digital assistant (PDA), or cellular phone, etc. While only one participant device 102 and one viewer device 112 are illustrated in FIG. 1, network architecture 100 may support a large number of concurrent sessions with many participant devices 102 and viewer devices 112. The participant device 102 and viewer device 112 can each include a push or pull mechanism to receive message updates from messaging platform 110.

In one implementation, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) or LTE-Advanced network), routers, hubs, switches, server computers, and/or a combination thereof.

In one implementation, the data store 150 may be a memory (e.g., random access memory), a cache, a drive (e.g., a hard drive), a flash drive, a database system, or another type of component or device capable of storing data. The data store 150 may also include multiple storage components (e.g., multiple drives or multiple databases) that may also span multiple computing devices (e.g., multiple server computers).

Each participant device 102 includes at least one event application 114 that allows a participant to engage in an event (e.g., play a video game, host a lecture) and to communicate, from within the event application 114, with viewers of a stream of the event. For example, the event application 114 may be a web browser that can present an interface (e.g., a video game, a lecture interface) to the participant. As a web browser, the event application 114 can also access, retrieve, present, and/or navigate content (e.g., web pages such as Hyper Text Markup Language (HTML) pages, digital media items, etc.) served by a web server. In another example, the event application 114 may be a stand-alone application (e.g., a mobile application or mobile app) that allows participants to engage in an event. In a further example, the event application 114 may be an application that is executing on a video game console and can be controlled by a user (e.g., the participant) via a remote controller. The event application 114 can be a stand-alone application or a client application installable on the video game console to communicate with a server application residing in a network server (e.g., event hosting platform 106). The event application 114 may be provided to the participant device 102 by the event hosting platform 106 (e.g., an internet-based game platform). For example, the event application 114 may be a browser that provides a video game that is embedded in a web page provided by the event hosting platform 106. In another example, the event application 114 may be an application that is downloaded from an application distribution platform, such as an "app store" (not shown) or executing from a CD-ROM or DVD-ROM coupled with the game console.

Each viewer device 112 can include a media viewer 116. The viewer device 112 can present content (e.g., a steam of a live event) to the viewer via the media viewer 116. The media viewer 116 may also provide an embedded media player (e.g., a Flash® player or an HTML5 player) that is embedded in a web page (e.g., a web page that may be related to the live event). In another example, the media viewer 116 may be a standalone application (e.g., a mobile application or mobile app) that allows users to subscribe to channels and consume digital media items (e.g., live events, digital videos, digital images, electronic books, etc.). The media viewer 116 may be provided to the viewer device by the content platform 108. For example, the media viewer 116 may be a browser that provides a media player that is embedded in a web page provided by the content platform 108. In another example, the media viewer 116 may be an application that is downloaded from an application distribution platform, such as an "app store" (not shown).

The event hosting platform 106, content platform 108, and the messaging platform 110 can be part of integrated platform 126 and may each include one or more computing devices, such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components.

The event hosting platform 106 may provide all or part of an event (e.g., a video game) to the participant device 102. For example, the participant may play a video game using a client application where portions of the game are provided by the event hosting platform 106. The event hosting platform 106 can facilitate an in-application (e.g., in-game) connection between multiple participant devices 102 such that the multiple participant devices 102 can interact with each other through the event hosting platform 106. For example, the event hosting platform 106 can act as an event host or server to which one or more participant devices 102 can connect. Participant devices 102 can be connected to the event hosting platform 106 via any type of network 104.

The content platform 108 may be an internet-based platform (e.g., a content sharing or hosting platform) that may provide digital content (e.g., live events, digital video, streaming video, images, digital music, streaming music, social media information, etc.) to one or more viewer devices 112 and may allow viewers to watch a stream of a live event. To provide digital content, for example, the content platform 108 may allow a viewer to subscribe to a paid or free channel. The content platform 108 can also allow the viewer to consume, upload, search for, curate, share, approve of ("like"), dislike, and/or comment on streamed events provided through various channels. The content platform may include a smart TV platform, content sharing platform, content recommendation platform, and the like.

The messaging platform 110 can provide messaging services that facilitate communication between users of the event hosting platform 106 and users of the content platform 108, such as between a participant engaged in a live event using the event hosting platform 106 and a viewer watching a live stream of the event using the content platform 108. The messaging platform 110, for example, can receive a message from the participant device 102 either directly or indirectly, such as via the event hosting platform 106. The messaging platform 110 can likewise receive a message from the viewer device 112 via the content platform 108. The messaging platform 110 can associate messages from the participant device 102 and the viewer device 112 into a message stream. The messaging platform 110 can provide, to the participant device 102 and the viewer device 112, messages from the message stream (e.g., via the event hosting platform 106 and content platform 108, respectively, or directly to the participant device 102 and the viewer device 112). The messaging platform 110 can also create instructions for how and when to present messages. The instructions can be metadata that indicates when to present a message, a presentation order, a presentation sequence number, and the like. The instructions can also include instructions to present a message according to its timestamp. The participant device 102 and the viewer device 112 can present the messages from the message stream to the participant or the viewer. The messaging platform 110 can use instructions to ensure synchronization of messages on the participant device 102 and the viewer device 112. For example, the message steam is implemented using a message queue, where the messaging platform 110 sorts each message and sends the messages to the participant device 102 and the viewer device 112 to be presented according to the order in which the messaging platform 110 sorted the messages.

In some implementations, delays can be taken into account when synchronizing messages from participants and viewers. For example, a twenty second delay can be introduced within an event. The messaging platform 110 can create instructions that instruct the participant device 102 and the viewer device 112 of the delay. In implementations, the messaging platform 110 is implemented not as a separate platform, but as a service that is integrated in both the event hosting platform 106 and the content platform 108.

The messaging platform 110 can store messages from the participant and the viewer as message records 120 in the data store 150. Data store 150 may include any number of message records 120a-n. Each message record 120 can include information about a particular message, including the message itself. For example, the message record can include the originating source of the message (e.g., participant device, viewer device), a message identification, a time the message was created, a time the message was received at the data store 150, a time the messaging platform 110 received the message, a unique identification associated with a participant, a session identification, an event identification, an application identification, a game identification, a lecture identification, and the like.

In implementations, a participant can submit a participant message via the event application 114 on the participant device 102. The participant device 102 can transmit the participant message, along with information about the participant message (as described above), to the messaging platform 110 via network 104. The messaging platform 110 can cause the participant message to be stored as a message record on the data store 150. Any information associated with the participant can also be stored in the data store 150. The data store 150 can store any number of message records 120a-n. The messaging platform 110 can cause messages from the data store 150 to be presented on the participant device 102 and the viewer device 112, as further described in conjunction with FIGS. 3-4 and 6.

Although each of the event hosting platform 106, the content platform 108, the messaging platform 110 and data store 150 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, virtual machines, and similar type of systems and devices. Each of these components can be implemented on a single server, a cluster of servers, a cloud, etc. These components can also be implemented individually, each on a separate server, cluster of servers, a cloud, etc.

In implementations, an event can be streamed in real-time (e.g., live) via a channel. An event can be digital content chosen by a channel curator. The channel curator can be a user, a participant, an agent of the participant, a content provider, a media company, a broadband provider, a broadcaster, a gaming service, a game provider, a game player, etc. The curator (e.g., a participant, an agent of the participant) can also perform management actions on the channel including requesting live-streaming of an event via the channel, defining subscription requirements for the channel, defining presentation attributes for channel content, defining access attributes for channel content, etc. The channel curator also can select various channel characteristics, such as whether the channel is free or paid. For paid channels, the curator can set or select a subscriber fee. The curator can also select different characteristics of the subscription, or define subscription levels that correspond to different types of access to the channels and corresponding subscriber fees. The content platform 108 can include multiple channels that are created or curated by different channel curators. Users, other than the curator of the channel, can subscribe to one or more channels in which they are interested.

Figure 2:
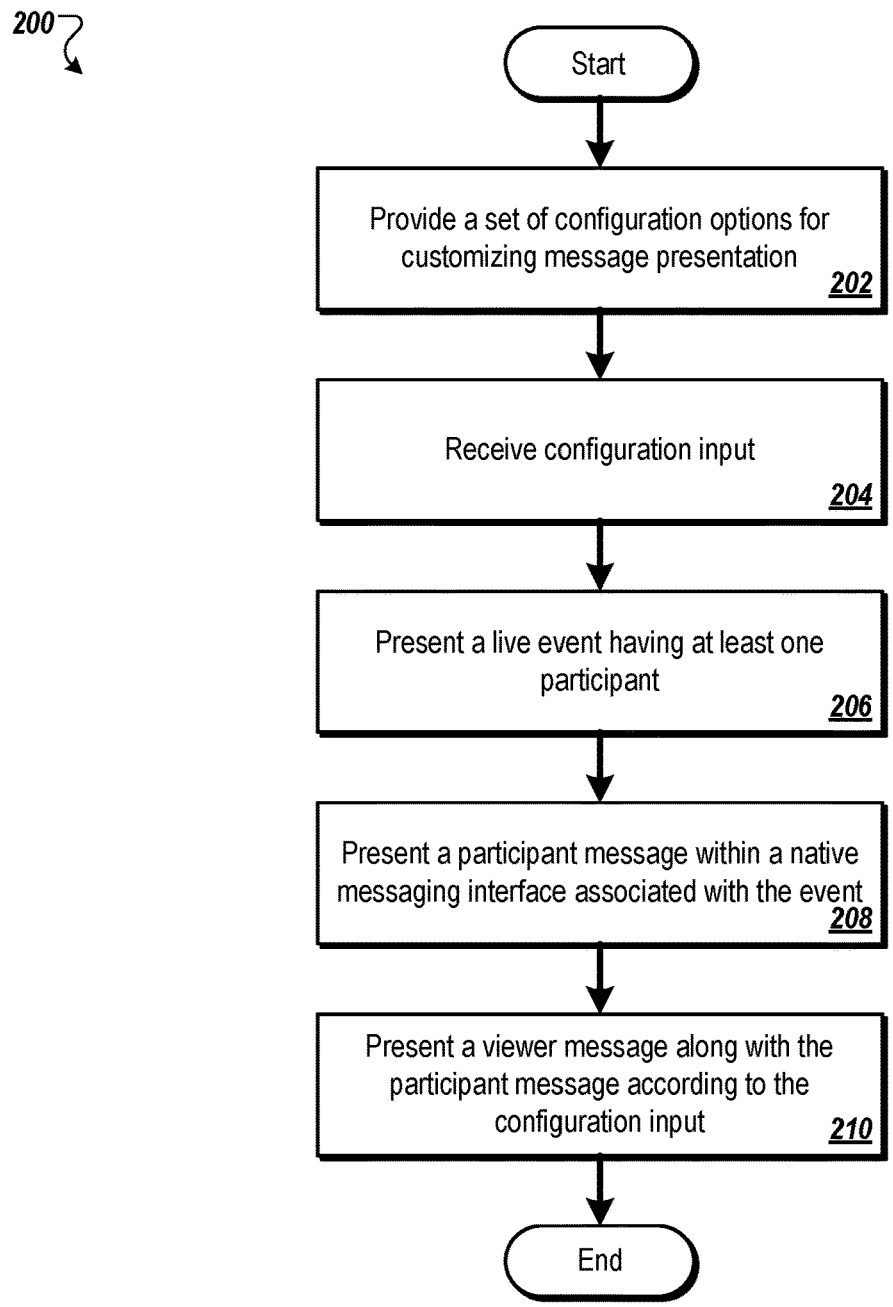
FIG. 2 is a flow diagram illustrating an implementation of a method for providing messages to a participant of a live event in accordance with implementations.

FIG. 2 is a flow diagram illustrating an implementation of a method 200 for providing messages to a participant of a live event in accordance with implementations. Method 200 can be performed by processing logic (e.g., in computing system 700 of FIG. 7) that may comprise hardware (e.g., circuitry, dedicated logic, programmable logic, microcode, etc.), software (such as instructions run on a processing device), firmware, or a combination thereof. In implementations, method 200 is performed primarily by the participant device 102 of FIG. 1. In one implementation, method 200 is performed primarily by event hosting platform 106 of FIG. 1.

At block 202, the processing logic provides a set of configuration options for customizing a message presentation to the participant of the live event. The participant can be allowed to make any number or type of configuration changes to the appearance of any messages presented in conjunction with the live event (e.g., segregate messages of a plurality of participants from messages of viewers of the live event), as described in further detail in conjunction with FIG. 5B. At block 204, the processing logic can receive configuration input that corresponds to a configuration option. For example, a participant can select a configuration option to differentiate between messages from other participants and from viewers of the live stream. The processing logic can receive this selection, such as via a graphical user interface.

At block 206, the processing logic presents a live event having at least one participant. The live event can be any type of event includes the example events described herein. The event can have any number of participants. The processing logic can present the event to the participant via the event application 114 of the participant device 102 of FIG. 1.

At block 208, the processing logic presents a participant message within a native messaging interface associated with the event (e.g., a messaging interface provided by the event application 114 and/or the event hosting platform 106). For example, a video game can have a native, in-game message interface. The processing logic can present the participant message within the in-game message interface. In implementations where the processing logic presents set of configuration options to the participant, the processing logic can present the viewer messages according to the configuration options selected by the participant. The processing logic can cause the participant messages to be presented by the event application 114 on participant device 102 of FIG. 1.

In implementations, presenting the one or more participant messages within the native messaging interface includes receiving a participant message. The processing logic can receive the participant message from any source, such as via the native messaging interface, via a microphone of the participant, and the like. The processing logic can then identify an event identifier of the event, as described in further detail in conjunction with FIG. 4. Then, the processing logic can select one or more participant messages corresponding to the event identifier for presentation to the participant via the native messaging interface.

At block 210, the processing logic presents one or more viewer messages within the native messaging interface. The viewer messages are entered by the viewer via a non-native messaging interface, such as an interface provided by the content platform 108 of FIG. 1. When presenting the viewer messages, the processing logic can integrate the viewer messages with the participant messages. In some implementations, the viewer messages presented within the native messaging interface are viewer messages entered via the non-native interface that are associated with an event identifier of the event, as described in further detail in conjunction with FIG. 4. The processing logic can select viewer messages corresponding to the event identifier for presentation to the participant via the native messaging interface. The processing logic can cause the viewer messages to be presented by the event application 114 on participant device 102 of FIG. 1.

Figure 3:
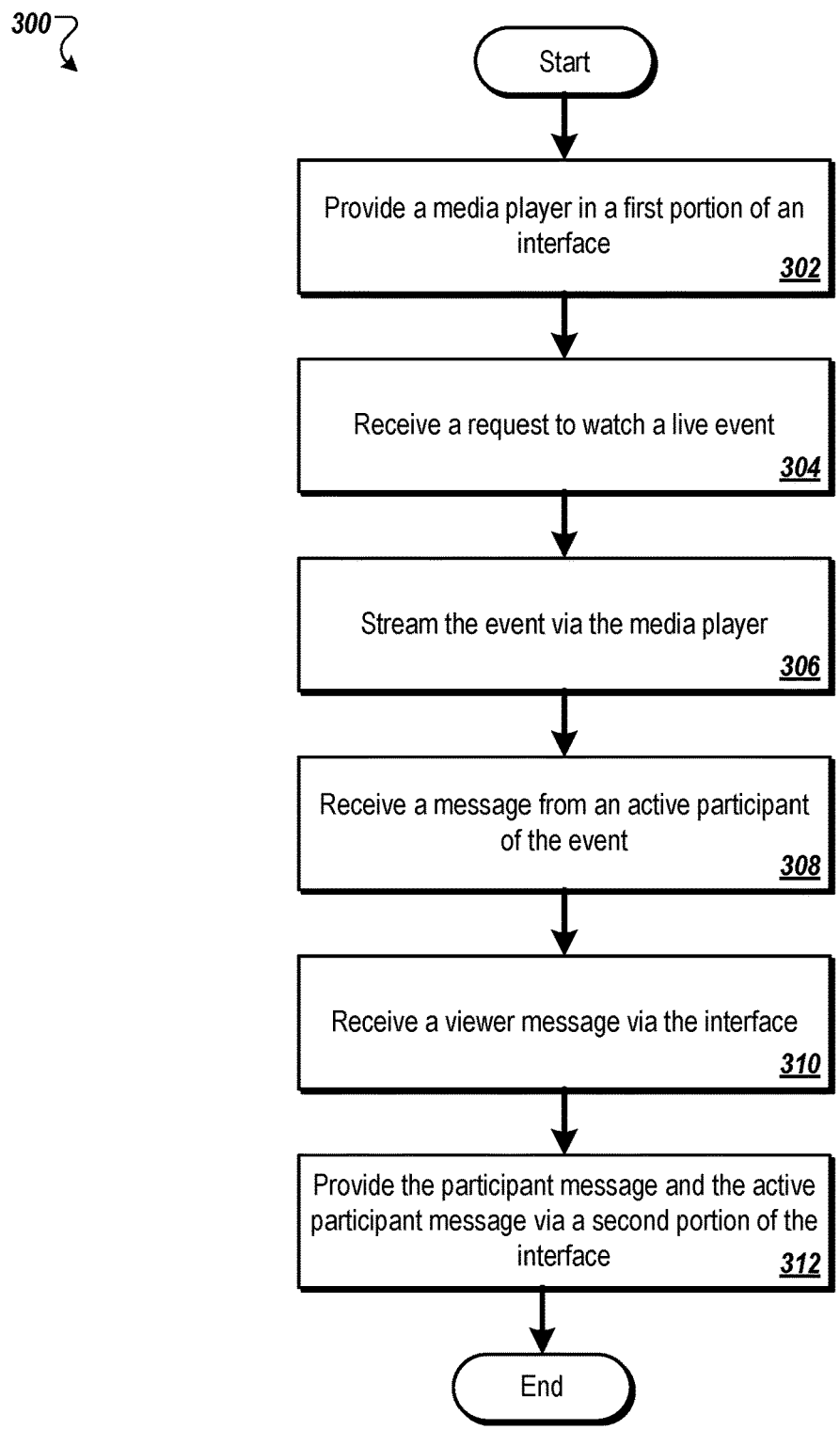
FIG. 3 is a flow diagram illustrating an implementation of a method for providing messages to a viewer of a live event in accordance with implementations.

FIG. 3 is a flow diagram illustrating an implementation of a method 300 for providing messages to a viewer of a live event in accordance with implementations. Method 300 can be performed by processing logic (e.g., in computing system 700 of FIG. 7) that may comprise hardware (e.g., circuitry, dedicated logic, programmable logic, microcode, etc.), software (such as instructions run on a processing device), firmware, or a combination thereof. In implementations, method 300 is performed primarily by the viewer device 112 of FIG. 1. In one implementation, method 300 is performed primarily by the content platform 108 of FIG. 1.

At block 302, the processing logic provides a media player in a user interface. The media player can be presented as an application or part of an application on a viewer device, such as media viewer 116 of viewer device 112 in FIG. 1. In implementations, the user interface includes two or more portions—the first portion for presenting the media player, and a second portion for presenting and receiving messages. The user interface can be any interface that is different from a native interface of an event hosting platform. For example, when the event is a video game, the native interface is an in-game messaging interface.

At block 304, the processing logic receives a request to watch a live event. The request can be a response to a viewer activating a "watch" or "play" button from within a graphical user interface. The event has at least one active participant (e.g., a game player, a lecturer, teacher, musician).

At block 306, the processing logic can stream the event via the media player. In implementations, the processing logic receives the stream of the event from a content platform (e.g., content platform 108 of FIG. 1).

At block 308, the processing logic receives a participant message from an active participant of the event. The processing logic can receive the participant message from an event hosting platform (e.g., event hosting platform 106 of FIG. 1) or from a messaging platform (e.g., messaging platform 110 of FIG. 1). The participant message is entered via a native interface of the event hosting platform during the live event.

At block 310, the processing logic receives one or more viewer messages via the user interface (e.g., the second portion) during the live event. At block 312, the processing logic provides the one or more viewer message and the one or more active participant messages for presentation in the user interface during the live event. The processing logic can cause the viewer messages to be presented by the media viewer application 116 on viewer device 112 of FIG. 1. In implementations, the processing logic integrates the viewer messages and the participant messages. In implementations, the processing logic receives instructions (e.g., metadata, timestamps) on how the viewer messages and the participant messages are to be presented. For example, the processing logic can synchronize the viewer messages and the participant messages, such as chronologically, according to respective timestamps of the messages for an integrated presentation in the user interface. The instructions for presenting the viewer messages and the participant messages can be generated by a messaging platform (e.g., messaging platform 110 of FIG. 1), event hosting platform (e.g., event hosting platform 106 of FIG. 1), a content platform (e.g., content platform 108 of FIG. 1).

In implementations, when providing active participant messages and viewer messages for presentation, the processing logic identifies an event identifier of the event. Then, the processing logic selects the viewer messages corresponding to the event identifier. The processing logic selects the active participant messages corresponding to the event identifier.

In some implementations, when presenting one or more viewer messages within the native messaging interface includes receiving multiple viewer messages entered via the user interface and selecting one or more viewer messages corresponding to an event identifier of the event. Alternatively, one or more participant messages corresponding to the event identifier of the event may be selected. In some implementations, one or more viewer messages and one or more participant messages corresponding to the event identifier of the event may be selected.

In some implementations, the processing logic sends any received viewer messages to a messaging platform, an event hosting platform or a participant device for presentation of the viewer messages to the event participant.

In some implementations, the processing logic also presents, via a media player, the viewer messages integrated with the active participant messages while streaming the live event. For example, the viewer is watching the event via the interface and types a message for the participant. The processing logic sends the message to the participant device, where it is presented. In this implementation, the processing logic presents to the viewer what the participant sees, including the message from the viewer.

Figure 4:
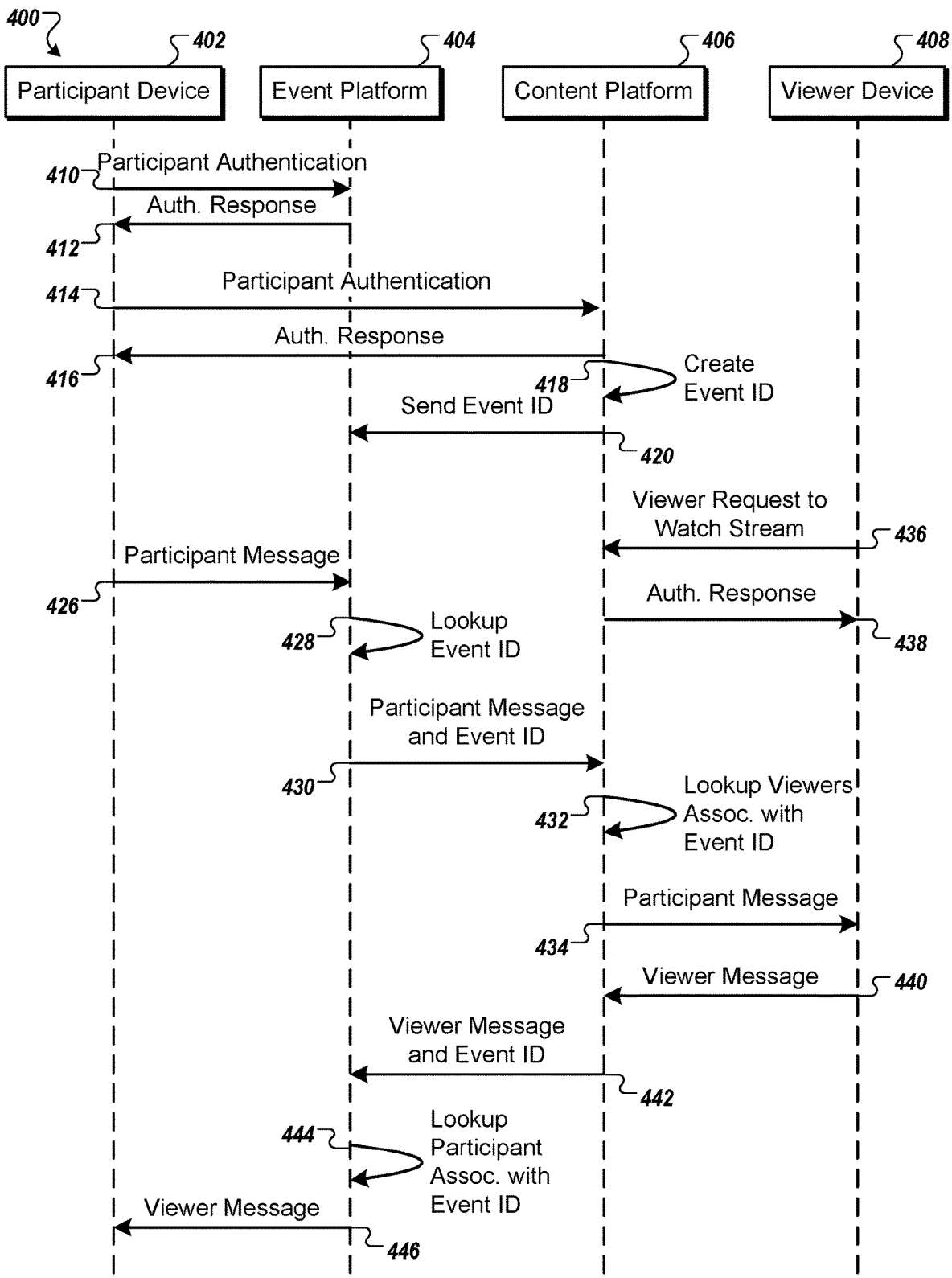
FIG. 4 illustrates a sequence diagram for providing message services between one or more participants of a live event and one or more viewers of the live event in accordance with implementations.

FIG. 4 illustrates a sequence diagram 400 for providing message services between one or more participants of a live event and one or more viewers of the live event. In this implementation, an event platform 404 (e.g., event hosting platform 106 from FIG. 1) and a content platform 406 (e.g., content platform 108 from FIG. 1) each have message components that communicate with each other.

To begin, at 410, a participant device 402 transmits an authentication request to the event platform 404. The authentication request can include participant credentials, such as a username and password. The event platform 404 receives the authentication request and attempts to authenticate the credentials of the participant against data in an authentication data store (not shown). If the received credentials are authenticated, at 412 the event platform 404 transmits an authentication response to the participant device 402. The participant device 402 is now authenticated. In implementations, the event platform 404 can also create an event token or session key that can be associated with the participant. The token or session key can also be associated with a particular event or session. The token can be used to identify the participant and/or the event. Optionally, the participant device 402 can then be authenticated with the content platform 406 that is to host and provide a stream of the live event at 414. The content platform 406 can authenticate the participant device 402 in a similar manner as the event platform 404 at 416. The content platform 406 creates an identifier (event ID) at 422 that is associated with the event and any related tokens. In implementations, the participant device 402 can authorize the event platform 404 to authenticate with the content platform 406 on behalf of the participant. Alternatively, the event platform 404 can communicate with the content platform 406 without the participant device 402 authorization. In other implementations, the participant device 402 can provide a single set of user credentials that are used to gain access to both the event platform 404 and the content platform 406. Once the participant device 402 or the event platform 404 is authenticated with the content platform, the content platform 406 can generate an event ID at 418 and associate the event ID with a user ID of the participant or participant device 402. The content platform 406 can create and store a record of viewers who are associated with an event ID. The content platform 406 can store the event ID in association with the user ID in a data store. The data store can have multiple entries for the same event ID, such as when multiple participants have been associated with the event. The data store may also have any number of entries for any number of events. At 420, the content platform 406 sends the event ID to the event platform 404. In implementations, the event platform 404 creates the event ID and sends it to the content platform 406. The content platform 406 may store the event ID in a data store. In further implementations, the participant device 402 creates the event ID and sends it to one or both of the event platform 404 and the content platform 406.

At any time, the event platform 404 can receive a participant message (illustrated as 426) along with a user ID of the participant. The event platform 404 can use the user ID to identify the event ID associated with the participant's user ID at 428. When an event is currently being held (e.g., being broadcast, streamed, etc.), it may be referred to an active event. The event platform 404 may store an indicator in association with the event ID that the event is an active event. When the event platform 404 identifies an active event ID, the event platform 404 can send (at 430) the participant message, the participant's user ID and the event ID to the content platform 406. The content platform 406 receives the participant message, the participant's user ID and the event ID and uses at least one of them to lookup any associated viewers at 432 in a data store that includes a record of viewers that are associated with an event ID. The content platform 406 then sends the participant message to any associated viewers at 434. A messaging service on or coupled to the content platform 406 can insert the received message into a compiled list of messages, such as those stored in data store 150 of FIG. 1. In implementations, the content platform 406 can generate a timestamp of when it received the message and can associate the timestamp with the message.

The event platform 404 may receive multiple viewer messages, wherein each of the multiple viewer messages may be associated with different event IDs. The event platform 404 may select one or more viewer messages corresponding to a specific event ID of the event. The selected one or more viewer messages may be presented within a UI at the client device.

The content platform 406 can provide the messages to the viewers, such as by using push or pull techniques. In implementations, the content platform 406 identifies a timestamp for when the message was created and provides messages according to their timestamps.

At any time, the content platform 406 can receive a request to access the event from a viewer device 408 at 436 and send authentication response to the viewer device 408 at 438. The request can include user credentials of the viewer. Alternatively, the content platform 406 can check if the viewer is logged in to the content platform 406. If the user is not logged in, then the content platform 406 can request user credentials. If the user is logged in, the content platform 406 can check if the viewer has access to the event. If so, the content platform 406 can provide access to the viewer device 408. If not, the content platform 406 can inform the viewer that the viewer does not have access to the event. In implementations, the content platform 406 can present information to the viewer on how to gain access to the event, such as by subscribing to a channel of the content platform 406.

Once the viewer device 408 is authenticated with the content platform 406, the viewer can view the event as well as messages associated with the event. The viewer may be presented with a list of events that are available for viewing. The viewer can also use the viewer device 408 to submit messages to the content platform 406 while watching the event. When sending a viewer message to the content platform 406 at 440, the viewer device 408 can include the event ID for the event that the viewer is watching. When receiving the message from a viewer device 408, the content platform 406 identifies the event ID for the event that the viewer is watching. The event ID, for example, can identify a game instance and can be specific to the participant (i.e., player) and to the particular game or even game session. The content platform 406 can forward the viewer message, the event ID to the event platform 404 at 442. The event platform 404 uses the event ID to identify the participant's user ID at 444. Once located, the event platform 404 transmits the viewer message to the participant at 446, such as according to a timestamp of the message relative to other messages.

Although implementations of the disclosure are discussed in terms of event hosting platforms, content platforms, messaging platforms and media consumption, implementations may also be generally applied to any type of social network providing connections between users, or to other implementations, such as live software tutorials. Implementations of the disclosure are not limited to content platforms that provide game streams to users.

In situations in which the systems discussed here collect personal information about users, or may make use of personal information, the users may be provided with an opportunity to control whether the event hosting platform, content platform or messaging platform collects user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the event hosting platform, content platform or messaging platform.

Figure 5A:
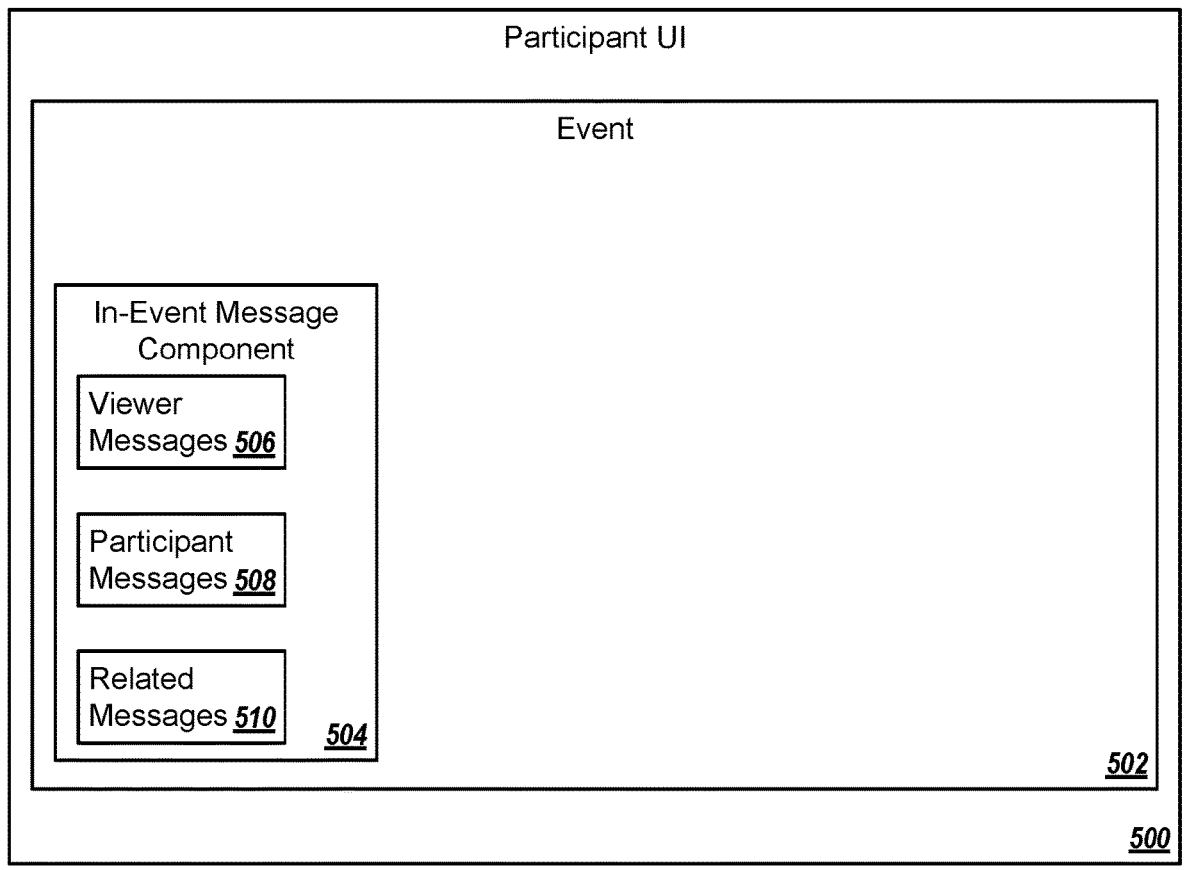
FIGS. 5A-5B illustrate example event participant graphical user interfaces (GUI) in accordance with implementations.
Figure 5B:
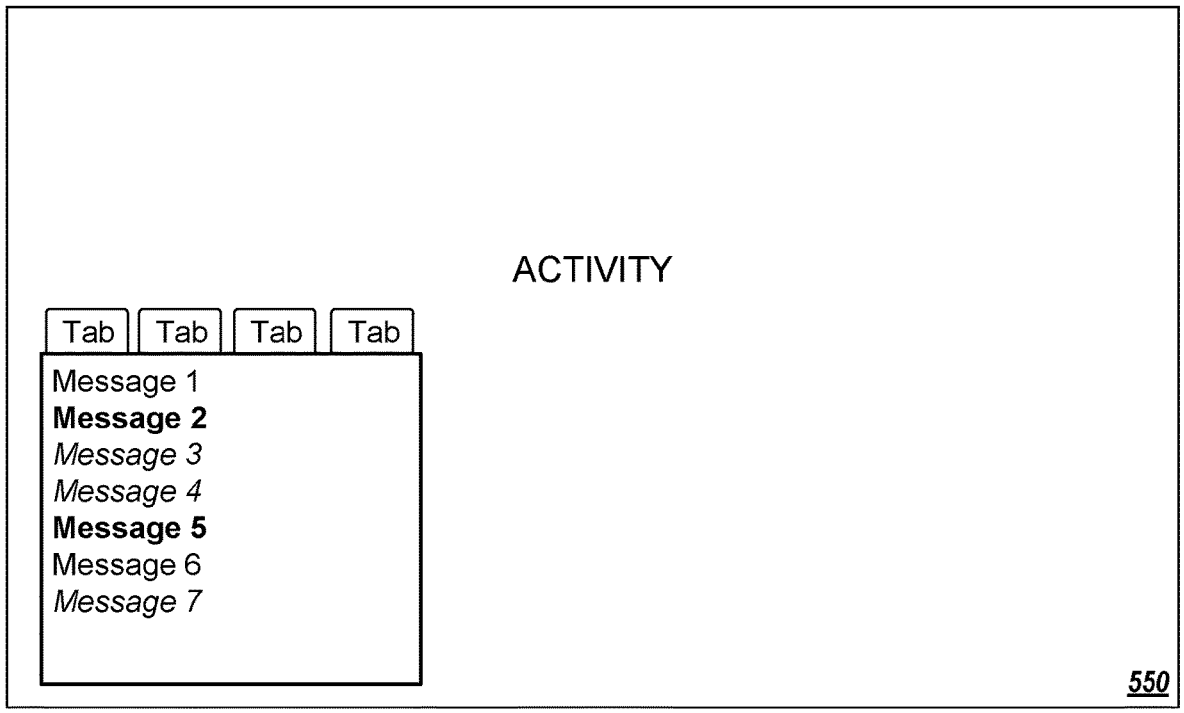

FIGS. 5A-5B illustrate example event participant graphical user interfaces (GUI) in accordance with implementations. The example GUIs may be presented by and/or displayed when a participant accesses an event hosting platform via an application (e.g., event application 114). Some example GUIs include control elements in the form of a button (e.g., a button for subscribing to a channel). However, various other control elements can be used for selection by a user such as a check box, a link, or any other user interface elements.

FIG. 5A illustrates an example participant UI 500 that presents an event 502. The event 502 can be any event and can be locally provided and presented. The event 502 can also be internet-based and rendered via the participant UI 500. The participant UI 500 can include an in-event message component 504 that can be used to receive participant messages 508 and to present messages to the participant. The in-event message component 504 can also include viewer messages 506, which can come from viewers of a live-stream of the event. The in-event message component 504 can also include related messages 510 that come from entities other than the participant and viewer, such as from an advertiser, an event hosting platform, a game platform, a content platform, a message platform, or other entities.

FIG. 5B illustrates another example of a participant UI 550 for configuring an in-event message component. The participant can be allowed to make any number or type of configuration changes to the in-event message component. For example, the configuration can include color coding messages from different sources—viewers can be depicted in blue italics, some participants can be in pink (e.g., on the same team) and other participant in red (e.g., opponents). The participant can provide a request via UI 500 to segregate messages within the display. In some embodiments, participant messages can be segregated from viewer messages. For example, participant messages can be one color, and viewer message can be another color. The in-event message component can also include organization tools, such as tabs, to help the participant configure message display. Segregation of the participant messages and the viewer messages may also include using tabs for different groups of messages and/or message sources. For example, a participant can specify a tab for messages from all viewers of the live-stream and another tab for messages from participants of the live-stream. Multiple tabs can be used to group messages in different ways. For example, a tab can be for squad members and another tab for clan members. Another tab can be for general messages among all participants in the event. Each tab can have configurable formatting options, such as color coding, typeset, etc.

In implementations, viewers can be categorized. For example, top viewers (e.g. biggest fans) of the participant or the participant's events can be identified as such. Top viewers can be determined by how and when the viewers interact with the participant. The content platform, for example, can detect viewer activity, posts, visits, comments, frequency, length of time, etc. The content platform can use information gathered about the viewer to classify the viewer as a top viewer. The top fans can be identified by badges, icons, avatars, colors, typeset, etc. In another example, new viewer can be identified as such.

Figure 6:
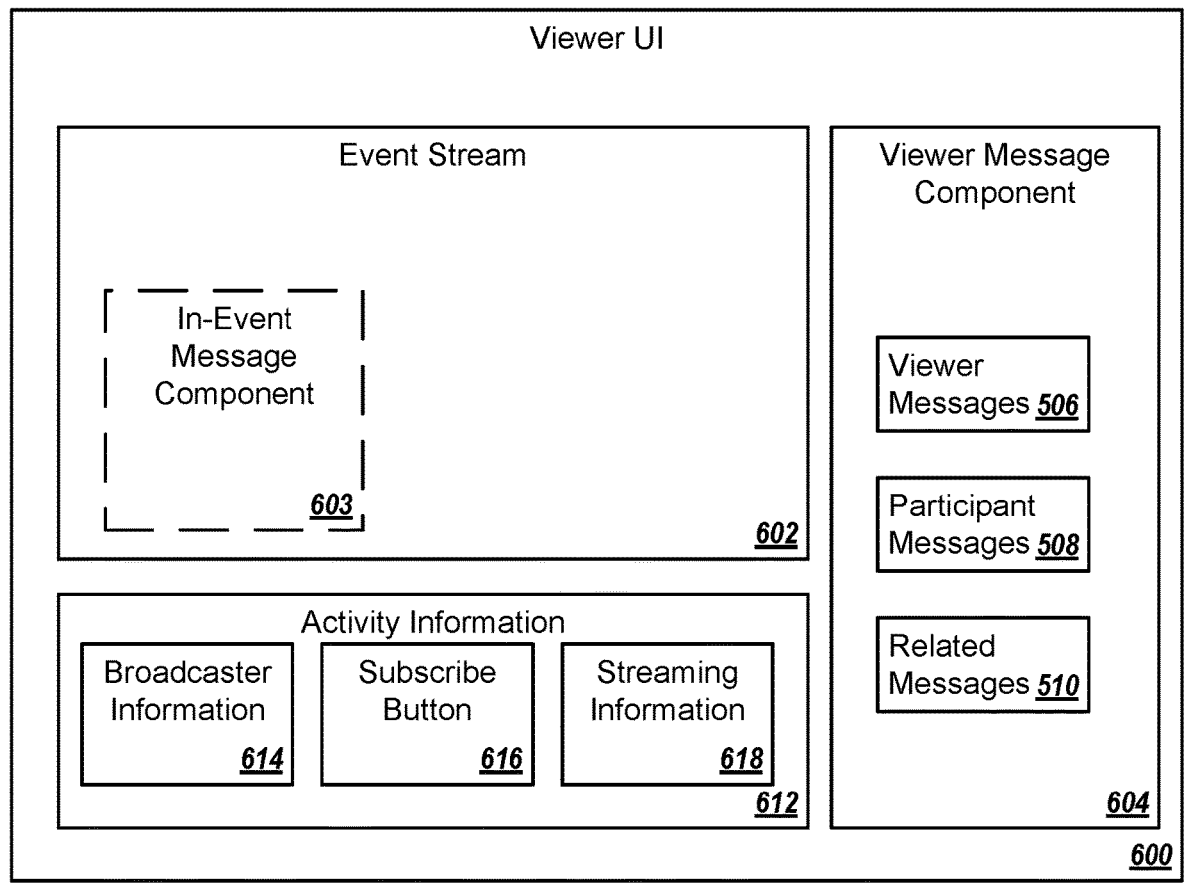
FIG. 6 illustrates an example viewer UI 600 in accordance with implementations

FIG. 6 illustrates an example graphical user interface (GUI) for a viewer of a live event in accordance with implementations. The example GUIs may be presented by and/or displayed within a web browser when the viewer accesses the content platform via the web browser. In another implementation, the example GUIs may be an interface presented by a media viewer (e.g., an app, an application, a program, a software module/component, etc., that may be used to view, stream, play, and/or consume media items of the channels). Some example GUIs include control elements in the form of a button (e.g., a button for subscribing to a channel). However, it should be noted that various other control elements can be used for selection by a viewer such as a check box, a link, or any other user interface elements.

The viewer UI 600 can include an event stream 602 provided by a media player (e.g., a flash player). The event can be streamed to the viewer in real time. Alternatively, the event can be streamed to the viewer after a time delay. The time delay can be any duration, such as five seconds, or fifteen seconds. In some implementations, an event participant can set the delay. In other implementations, a messaging platform can delay messages based on an existing delay.

In some implementations, the event stream 602 provides content that the participant of the event can see in the event, including an in-event message component 603. The in-event message component 603 and the viewer messages 506 and participant messages 508 can be in-sync. In other implementations, some features of the event are omitted from the stream. For example, the in-event message component 603 can be omitted from the live stream. One reason for omitting the in-event message component 603 can be to prevent opponent players of a video game from obtaining an unfair advantage by viewing the participant's message exchange with viewers. The viewer UI 600 can include a viewer message component 604 that can include viewer messages 506, participant messages 508 and/or related message 510, each described above in conjunction with FIG. 5A. In implementations, viewer UI 600 can include additional information 612 about the event, such as broadcaster information 614 (e.g., channel information, participant information, game information), a subscribe button 616 that permits a viewer to subscribe to the event (e.g., to a channel that presents events), and streaming information 618 (e.g., number of current viewers, likes, dislikes, dates, times).

Figure 7:
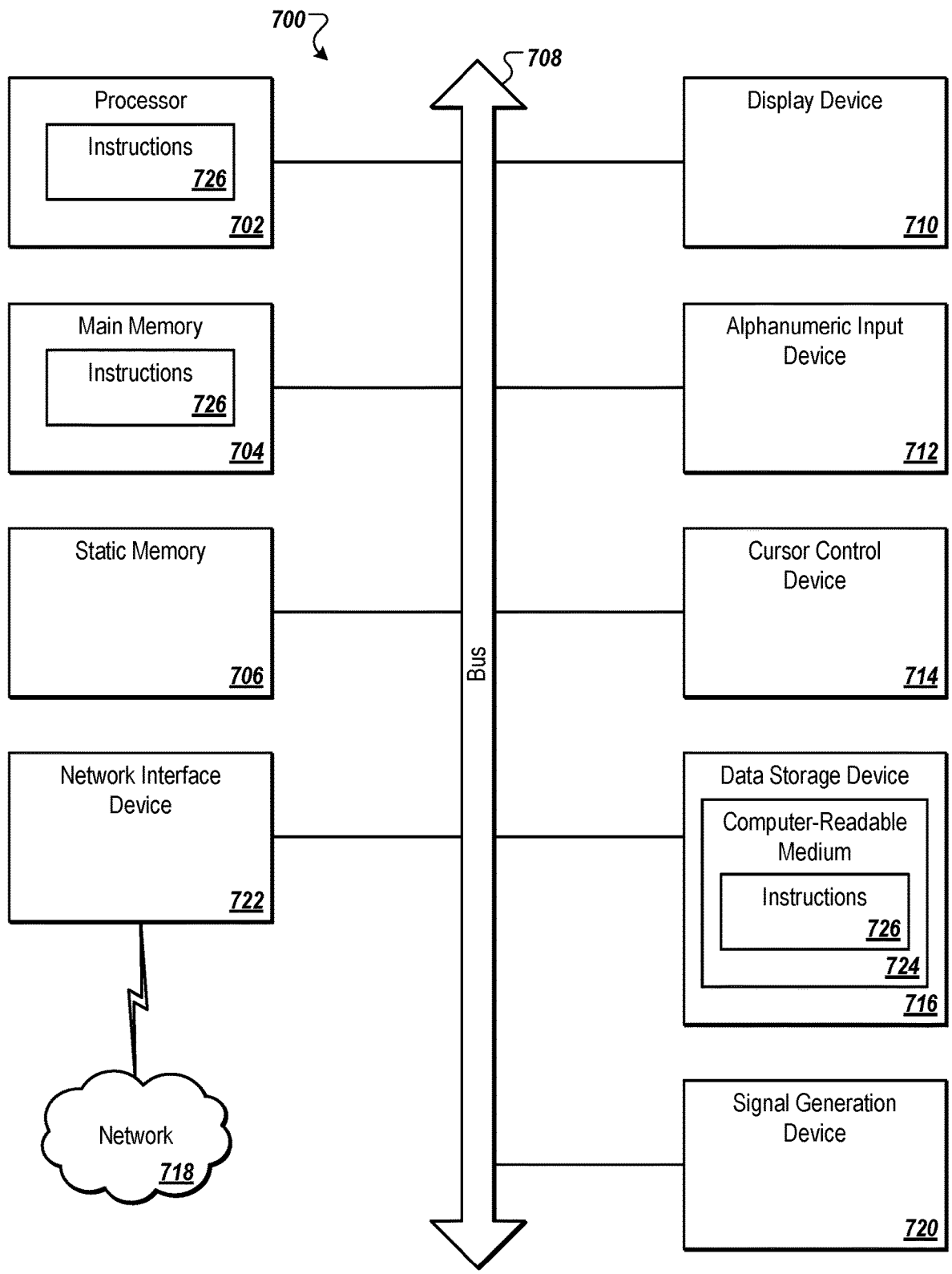
FIG. 7 is a schematic diagram that shows an example of a machine in the form of a computer system 700.

FIG. 7 is a schematic diagram that shows an example of a machine in the form of a computer system 700. The computer system 700 executes one or more sets of instructions 726 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 726 to perform any one or more of the methodologies discussed herein.

The computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions for performing the operations and steps discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored the sets of instructions 726 of the dynamic media viewer embodying any one or more of the methodologies or functions described herein. The sets of instructions 726 of the dynamic media viewer may also reside, completely or at least partially, within the main memory 704 and/or within the processor 702 during execution thereof by the computer system 700, the main memory 704 and the processor 702 also constituting computer-readable storage media. The sets of instructions 726 may further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions 726. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "assigning," "generating," "presenting," "transmitting," "obtaining," "displaying," "forming," or the like, may refer to the actions and processes of a machine, a computer system, or similar electronic computing device, that manipulates and transforms data represented as physical (e.g., electronic) quantities within the machine's registers and memories into other data similarly represented as physical quantities within the machine memories or registers or other such information storage, transmission or display devices.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this disclosure to "one implementation," or "an implementation" means that a particular feature, structure, or characteristic described in connection with the implementation or implementation is included in at least one implementation. Thus, the appearances of the phrase "in one implementation," or "in an implementation" in various places throughout this specification are not necessarily all referring to the same implementation. Furthermore, the particular features, structures, or characteristics may be combined in any suitable manner in one or more implementations.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The methods and systems described herein can be used in a wide variety of implementations, including as part of a mobile application ("app"), and can be part of photo or video-related software including a mobile operating system. Apps installed on the mobile device can access the systems and methods via one or more application programming interface (API).

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

What is claimed is:

1. A method comprising:
receiving, by a processing device, one or more inputs of one or more participants of a video game for a set of message presentation configurations of messages that relate to a stream of the video game provided by an event platform, the one or more inputs of the one or more participants comprising a request to change organization of messages to segregate participant messages of the one or more participants of the video game from a plurality of viewer messages entered by a plurality of viewers of the video game;
presenting, by the processing device, a messaging user interface with the stream of the video game provided by the event platform, wherein:
each of the one or more participants participate in the video game via an event application on a respective participant device connected to the event platform via a network,
the plurality of viewer messages are communicated to each of the one or more participants,
the stream of the video game is presented on a screen of a participant device of a participant of the one or more participants, and
the stream of the video game is provided to each viewer of the plurality of viewers for playback by a media player on a respective viewer device connected to the event platform via the network; and presenting, within the messaging user interface on the screen of the participant device of the participant, the participant messages of the one or more participants of the video game and the plurality of viewer messages of the plurality of viewers while concurrently presenting the stream of the video game on the screen of the participant device of the participant, wherein the viewer messages are presented concurrently with the participant messages in the messaging user interface on the screen of the participant device of the participant based on the one or more inputs of the one or more participants for the set of message presentation configurations.

2. The method of claim 1 further comprising providing the set of message presentation configurations to permit the participant to customize message presentation of the messaging user interface.

3. The method of claim 1, wherein the set of message presentation configurations comprises an option to permit the participant to configure an appearance of one or more participant messages.

4. The method of claim 3, wherein the appearance is related to at least one of a font, color, typeset, style, size, or text effect.

5. The method of claim 1, further comprising:
receiving viewer messages entered via a content platform interface, the viewer messages being associated with different event identifiers; and
selecting one or more viewer messages corresponding to an event identifier of the video game for presentation within the messaging user interface.

6. The method of claim 1, further comprising:
receiving participant messages associated with different event identifiers; and
selecting one or more participant messages corresponding to an event identifier of the video game for presentation within the messaging user interface.

7. A system comprising:
a memory; and
a processing device coupled to the memory, the processing device to perform operations comprising:
receiving one or more inputs of one or more participants of a video game for a set of message presentation configurations of messages that relate to a stream of the video game provided by an event platform, the one or more inputs of the one or more participants comprising a request to change organization of messages to visually segregate participant messages of the one or more participants of the video game from a plurality of viewer messages entered by a plurality of viewers of the video game;
presenting a messaging user interface with the stream of the video game provided by the event platform, wherein:
each of the one or more participants participate in the video game via an event application on a respective participant device connected to the event platform via a network,
the plurality of viewer messages are communicated to each of the one or more participants,
the stream of the video game is presented on a screen of a participant device of a participant of the one or more participants, and
the stream of the video game is provided to each viewer of the plurality of viewers for playback by a media player on a respective viewer device connected to the event platform via the network; and presenting, within the messaging user interface on the screen of the participant device of the participant, the participant messages of the one or more participants of the video game and the plurality of viewer messages of the plurality of viewers while concurrently presenting the stream of the video game on the screen of the participant device of the participant, wherein the viewer messages are presented concurrently with the participant messages in the messaging user interface on the screen of the participant device of the participant based on the one or more inputs of the one or more participants for the set of message presentation configurations.

8. The system of claim 7, the operations further comprising providing the set of message presentation configurations to permit the participant to customize message presentation of the messaging user interface.

9. The system of claim 7, wherein the set of message presentation configurations comprises an option to permit the participant to configure an appearance of one or more participant messages.

10. The system of claim 9, wherein the appearance is related to at least one of a font, color, typeset, style, size, or text effect.

11. The system of claim 7, the operations further comprising:
receiving viewer messages entered via a content platform interface, the viewer messages being associated with different event identifiers; and
selecting one or more viewer messages corresponding to an event identifier of the video game for presentation within the messaging user interface.

12. The system of claim 7, the operations further comprising:
receiving participant messages associated with different event identifiers; and
selecting one or more participant messages corresponding to an event identifier of the video game for presentation within the messaging user interface.

13. A non-transitory computer readable storage medium including instructions that, when executed by a processing device, cause the processing device to perform operations comprising:
receiving one or more inputs of one or more participants of a video game for a set of message presentation configurations of messages that relate to a stream of the video game provided by an event platform, the one or more inputs of the one or more participants comprising a request to change organization of messages to visually segregate participant messages of the one or more participants of the video game from a plurality of viewer messages entered by a plurality of viewers of the video game;
presenting a messaging user interface with the stream of the video game provided by the event platform, wherein:
each of the one or more participants participate in the video game via an event application on a respective participant device connected to the event platform via a network,
the plurality of viewer messages are communicated to each of the one or more participants,
the stream of the video game is presented on a screen of a participant device of a participant of the one or more participants, and the stream of the video game is provided to each viewer of the plurality of viewers for playback by a media player on a respective viewer device connected to the event platform via the network; and presenting, within the messaging user interface on the screen of the participant device of the participant, the participant messages of the one or more participants of the video game and the plurality of viewer messages of the plurality of viewers while concurrently presenting the stream of the video game on the screen of the participant device of the participant, wherein the viewer messages are presented concurrently with the participant messages in the messaging user interface on the screen of the participant device of the participant based on the one or more inputs of the one or more participants for the set of message presentation configurations.

14. The non-transitory computer readable storage medium of claim 13, the operations further comprising providing the set of message presentation configurations to permit the participant to customize message presentation of the messaging user interface.

15. The non-transitory computer readable storage medium of claim 13, wherein the set of message presentation configurations comprises an option to permit the participant to configure an appearance of one or more participant messages.

16. The non-transitory computer readable storage medium of claim 15, wherein the appearance is related to at least one of a font, color, typeset, style, size, or text effect.

17. The non-transitory computer readable storage medium of claim 13, the operations further comprising:

receiving viewer messages entered via a content platform interface, the viewer messages being associated with different event identifiers; and selecting one or more viewer messages corresponding to an event identifier of the video game for presentation within the messaging user interface.

18. The non-transitory computer readable storage medium of claim 13, the operations further comprising:

receiving participant messages associated with different event identifiers; and selecting one or more participant messages corresponding to an event identifier of the video game for presentation within the messaging user interface.

* * * * *